United States Patent [19]
Lajovic

[11] 3,940,834
[45] Mar. 2, 1976

[54] APPARATUS FOR SEVERING AND FEEDING LIGHTWEIGHT TUBULAR PLASTIC ELEMENTS

[76] Inventor: Dusan S. Lajovic, c/o Colgate-Palmolive Company, 300 Park Ave., New York, N.Y. 10022

[22] Filed: Nov. 19, 1973

[21] Appl. No.: 417,194

Related U.S. Application Data

[63] Continuation-in-part of Ser. No. 340,293, March 12, 1973.

[52] U.S. Cl. .................. 425/403; 29/33 E; 29/234; 425/500
[51] Int. Cl.² ....................................... B23D 25/00
[58] Field of Search .................. 425/403, 392–393, 425/302 R, 326 R, 310, 505, 383, 397, 500; 264/292, 291, 285, 290; 93/19, 20; 72/283, 370; 53/290, 291, 295; 29/33 E, 234

[56] References Cited
UNITED STATES PATENTS

| | | | |
|---|---|---|---|
| 2,623,673 | 12/1952 | Holstein | 53/291 |
| 2,765,607 | 10/1956 | Aguilar et al. | 53/291 |
| 2,846,835 | 8/1958 | Aguilar et al. | 53/291 |

Primary Examiner—Francis S. Husar
Assistant Examiner—Robert J. Charvat
Attorney, Agent, or Firm—Strauch, Nolan, Neale Nies & Kurz

[57] ABSTRACT

Apparatus for applying cover elements of heat shrinkable plastics material upon the externally screw threaded metal necks of dispensing containers such as toothpaste tubes comprises a floating mandrel rod assembly adapted to be disposed within the leading end of a continuous length of synthetic plastics tubing for cooperation with feeding and cutting arrangements for operating upon the tubing to separate therefrom successive cover elements of desired length and dispose each element on a container neck prior to a heat shrinking operation for permanently securing the elements upon the threaded necks.

23 Claims, 10 Drawing Figures

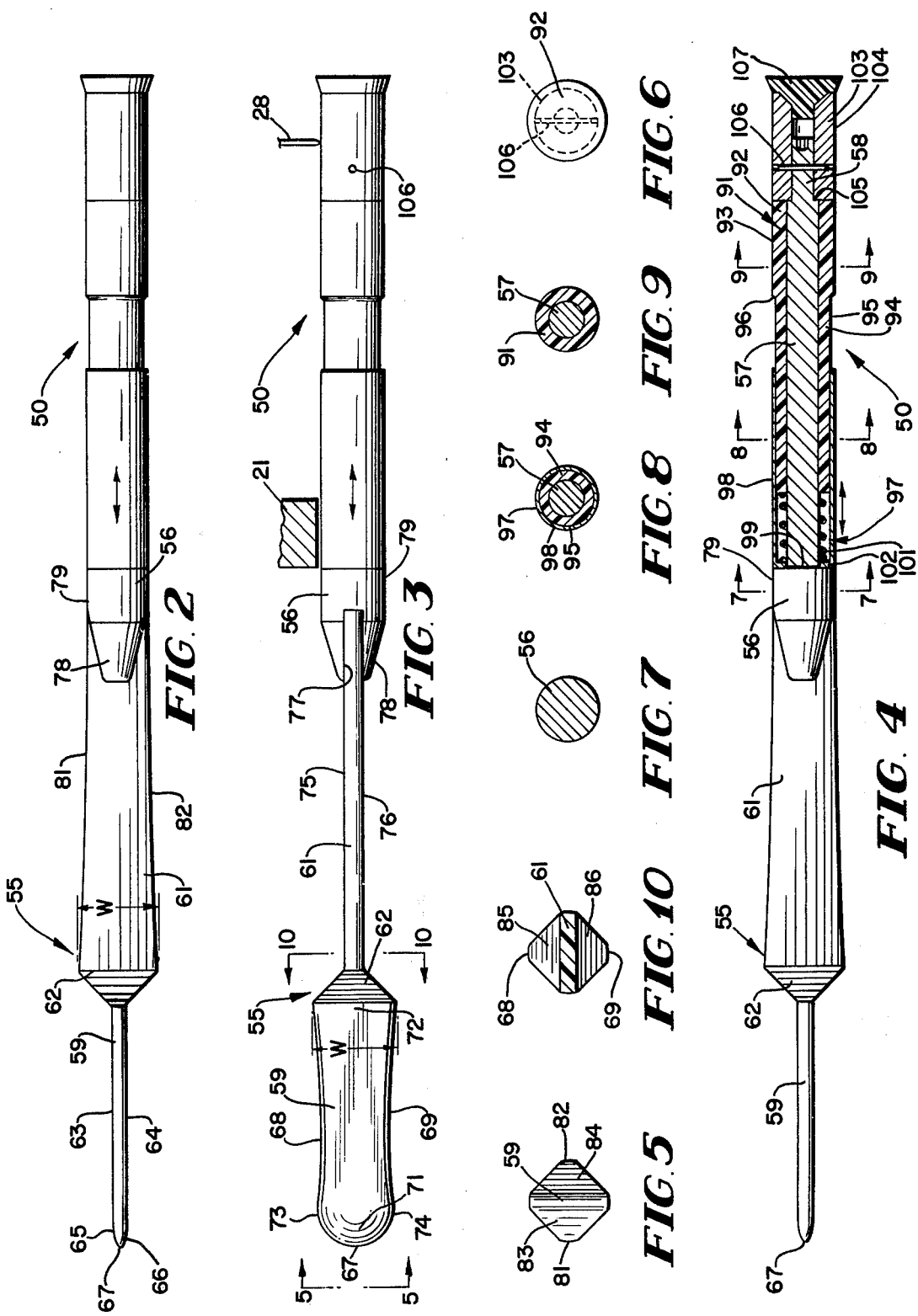

APPARATUS FOR SEVERING AND FEEDING LIGHTWEIGHT TUBULAR PLASTIC ELEMENTS

This is a continuation-in-part of copending application Ser. No. 340,293, filed Mar. 12, 1973 for METHOD AND APPARATUS FOR PROTECTIVELY COVERING CONTAINER NECKS.

This invention relates to apparatus wherein relatively small lightweight elements of synthetic plastics material are formed from tubing of that material and successively advanced to surround the threaded or like formed neck surfaces of dispensing containers and the like, and more particularly to a novel floating mandrel rod assembly for coaction with cutting and feeding arrangements.

In the manufacture of flexible walled dispensing container tubes such as aluminum or aluminum alloy toothpaste tubes, it is customary to form upon one end a relatively rigid reduced diameter discharge neck having an external screw thread adapted to removably mount an internally threaded closure cap. Where the contents of the tube include abrasive particles, such as in many toothpastes, paste deposited on the external surface of the neck at or near the exit orifice of the neck tends to become discoloured as it spreads onto and abrades the relatively softer exposed aluminum surface of said neck, especially when said cap is removed and reinstalled a number of times during use of the tube contents.

In my copending application Ser. No. 340,293 filed Mar. 12, 1973 there is disclosed in detail methods and apparatus wherein thin-walled lightweight tubular elements of required size are severed in succession from the leading end of a continuous length of tubing of heat shrinkable synthetic plastics and each of these elements is positioned and heat shrunk in permanent surrounding relation upon the external metal surface of a dispensing container neck. This covering protects the metal surfaces against abrasion. This apparatus includes a floating mandrel rod assembly adapted to be disposed within the tubing at the leading end for spreading the tubing from a relatively flat condition of storage on a rotatable reel to tubular condition for coaction with cutting and feeding devices. The present application is directed to floating mandrel assembly features which are of special advantage in such apparatus.

The invention provides as an important advantage a special floating mandrel shape and structure for spreading synthetic plastics tubing from flat to tubular condition and for feeding and guiding the expanded tubing toward the neck of a container positioned in a cover element applying station.

The mandrel of the invention is further advantageous in that the tubing spreading is effected by longitudinally rigid but laterally flexible webs which are preferably integral and at right angles to each other and composed of a hard smooth synthetic plastic presenting no sharp cutting edges to the tubing.

Another advantage of the mandrel of the invention lies in the provision of a special spring biased longitudinally displaceable feed sleeve.

Further advantages of the invention will appear as the disclosure proceeds with reference to the appended claims and the structure shown in the annexed drawings.

BRIEF DESCRIPTION OF DRAWINGS

FIG. 2 is an elevation showing a preferred form of a floating mandrel apart from the machine of FIG. 1;

FIG. 3 is an elevation at right angles to the direction of FIG. 2 further showing the mandrel of FIG. 2;

FIG. 4 is an elevation like FIG. 2 but partly in section showing detail of the mandrel;

FIG. 5 is an end view of the mandrel as at line 5—5 in FIG. 3;

FIG. 6 is an opposite end view of the mandrel;

FIGS. 7, 8, and 9 are sections substantially on lines 7—7, 8—8, and 9—9 in FIG. 4; and FIG. 10 is a section substantially on line 10—10 of FIG. 3.

PREFERRED EMBODIMENTS

Figure 1:
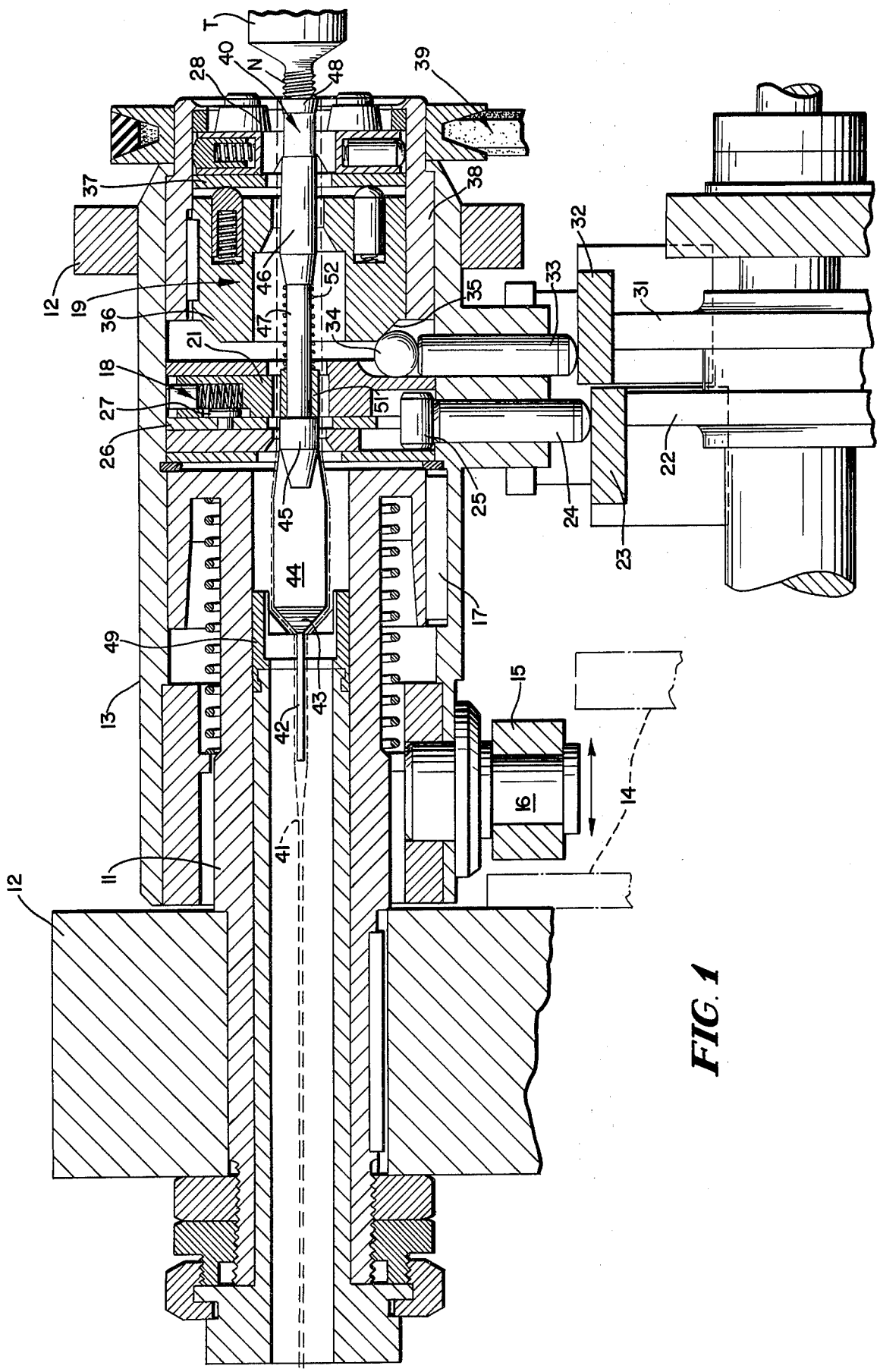
FIG. 1 is an elevation mainly in section illustrating the invention in a useful embodiment and operably incorporated in a machine for supply covering elements of heat shrinkable material to threaded members to be covered.

FIG. 1 shows one form of mandrel in its operative environment wherein it is surrounded by the leading end of plastic tubing and associated with cooperating tubing feeding and severing mechanisms.

In FIG. 1 a mounting tube 11 is fixed on the machine frame 12 and it slidably supports a tubular casing 13 for axial reciprocation. Casing 13 is reciprocated by the action of a pair of axial-throw face cams 14 engaging a follower roller 15 on a pin 16 fixed to casing 13, and relative rotation between casing 13 and tube 11 is prevented by a slidable key and slot connection 17 therebetween.

Casing 13 has mounted within it a chuck assembly 18 and a cutter assembly 19. Chuck assembly 18 comprises a plurality of radially movable jaws 21 periodically displaced between active and inactive positions by motion transmitted from a rotatable cam 22, rock bar 23, slidable pin 24, roller 25, rotatable follower plate 26 and rollers 27 on the follower plate engaged in oblique slots on jaws 21. The operation of this structure in periodically moving clutch jaws into the active position wherein the jaws grip the tubing surrounding the mandrel is disclosed in said Ser. No. 340,293. Cutter assembly 19 comprises a circumferential series of knives 28 that are periodically displaced between active and inactive positions under the influence of a rotatable cam 31 acting through a rockable bar 32, slidable pin 33, ball 34 engaging an inclined face 35 on a longitudinally slidable member 36 and spring biased brackets 37 carrying the knives 28. The operation of this structure in periodically moving knives 28 into active position wherein they sever the tubing surrounding the mandrel is disclosed in said Ser. No. 340,293.

Member 36 is longitudinally slidably mounted within a drive sleeve 38 rotatably mounted in casing 13, and sleeve 38 is rotated by a belt drive and pulley arrangement at 39.

A floating mandrel rod assembly 40 is disposed with casing 13, and flattened polyethylene or like heat shrinkable plastic tubing 41 entering through mounting tube 11 is first opened to tubular condition by the rear end of the mandrel, the left end in FIG. 1, and goes on in close surrounding relation to the mandrel as will appear so that in operation of the machine relatively short tubular elements may be periodically severed from the leading end of the tubing 41 and moved to cover the threaded section of an article presented in axial alignment with the mandrel such as the toothpaste tube T having an externally threaded neck N shown in FIG. 1.

During operation of the foregoing the tubing surrounding the mandrel is periodically severed by the cutting assembly 19 to provide the thread covering element of desired length and then the casing 13 is moved to the left in FIG. 1 to push the severed element onto the threads at N.

Referring to FIG. 1, the tubing spreading distal web 42 of mandrel 40 projects inside the flat tape 41 and merges by way of shoulder piece 43 into tubing spreading web 44 disposed at right angles to the distal web 42. The angle of shoulder 43 is preferably 45°. The effect of the tape passing over webs 42 and 44 is to reshape it from flat condition to expanded tubular condition. Web 44 is fixed relative to a first cylindrical barrel portion 45 of the mandrel which adjoins a second cylindrical barrel portion 46 by way of a reduced diameter shank or stem 47. The mandrel barrel portion 46 has a cylindrical severing portion 47' of the same or a slightly reduced diameter and this severing portion merges into a diverging tapered end-piece 48 which at the extreme end of the mandrel has its diameter substantially equal to that of the barrel portions 45 and 46; that is, a diameter which is smaller than that of the tubing by no more than is necessary for that material to be able to slide freely along the mandrel.

Mandrel 40 is advantageously of special composite construction. Preferably the webs 42 and 44 which may be formed as an integral unit are composed of a hard smooth synthetic plastics material such as polytetrafluoroethylene. This has been found markedly superior to metal for providing smooth efficient opening of the moving flat plastic tubing and it is light in weight. The mandrel body section comprising barrel portion 45, shank 47, barrel portion 46 may advantageously be of metal for hardness and rigidity. The end piece 48 which abuts the container neck is preferably composed of a heat insulating material such as polytetrafluoroethylene inserted for example as a plug fixed on the hollow end of barrel portion 46, and its purpose as will appear is to minimize heat loss from the metal container tube during the operation of applying the covering element.

As illustrated, the mandrel assembly throughout its length is peripherally encased by the expanded plastics tubing and, because of this, the mandrel assembly is unsupported except through the tubing.

The mandrel assembly has a small degree of universal floatability; that is, it is not absolutely restrained against movement in any direction, although its freedom for such movement is very limited. It does have enough freedom of longitudinal movement to insure that it presses adequately against the container neck as the tubing is being fed to dispose a severed element on the neck. Thus, the mandrel is supported loosely by the integers which surround its barrel portions and also by its shoulder portion 43 which sits within a supporting collar 49. This supporting collar is formed in two semisylindrical portions which are concentrically disposed within tube 11.

The incoming tubing is spread by the web 44 at right angles to the plane of flatness from which it has been initially spread by the web 42. By the time the leading end of the tubing reaches and starts sliding over mandrel barrel portion 45 it is expanded to substantially cylindrical open end condition.

The tubing continues to encase the mandrel right to the neck covering station and when the tubular open leading end reaches that station a suitable short length or cover element is severed from it. The severed cover element together with the remainder of the tubing surrounding the mandrel is then advanced for the neck covering operation. The mandrel itself during the tubing feeding operation advances slightly in the direction towards the container neck positioned to receive the cut-off element, but it is soon halted by abutment with the container neck endwise presented to the mandrel in the applying station. The heat insulated end 48 of the mandrel guards against heat transfer from the container. When the mandrel has been so halted and remains in abutment with the container neck, the severed element will continue to advance relative to the mandrel under the action of the intermittent tubing feeding means coacting with sleeve 51 to be described later so that it is applied in surrounding relation to the container neck.

The foregoing machine and mandrel construction and mode of operation is the same as disclosed in my earlier application Ser. No. 340,293 to which reference is made for any further detail necessary to understand the same.

The split supporting collar 49 restrains excessive endwise movement of the mandrel away from the element applying station and in that station endwise movement of the mandrel is restrained by the occasional presence of a container neck. On such occasions when a container may not be presented at the station, the mandrel is prevented from excessive endwise movement (to the right in FIG. 1) by the frictional contact around it of the tubing and this is sufficient simply because under those circumstances (no container neck presented to the station) the mandrel is not subjected to any force tending to advance it relative to the station.

A freely slidable feed sleeve 51 surrounds shank 47 and is lightly axially spring loaded by a compression spring 52. In operation after cutter assembly 19 has been operated by cam 31 to sever an element of predetermined length from the leading end of tubing 41 chuck jaws 21 are displaced from their retracted inactive position to an active position where they grip the tubing surrounding sleeve 51 for intermittent feed of the tubing toward the element applying station when casing 13 is operated by cam 14, all as disclosed in said application Ser. No. 340,293.

A preferred form of floating mandrel rod assembly construction will be now described in detail with respect to FIGS. 2–10 wherein the mandrel unit is designated at 50.

Mandrel 50 which is illustrated is substantially full size in FIGS. 2 and 3 comprises a tape spreading web section 55 fixed at one end to a body section having a cylindrical metal barrel 56 and a coaxial cylindrical stem 57 integral with the barrel and terminating in a reduced diameter section 58. Web section 55 is preferably integrally formed of a hard smooth inert synthetic plastic, preferably polytetrafluoroethylene, and consists of two relatively thin flat webs 59 and 61 joined by a shoulder section 62. Webs 59 and 61 lie in planes at right angles to each other are of a special shape that promotes easy efficient spreading of the flat tape into tubular condition.

Web 59 first engaged by the tape has planar side surfaces 63 and 64 with end areas 65 and 66 inclined toward each other to form a narrow edged rounded wedge-like smooth end at 67. Between the shoulder section 62 and end 67, the side edges of web 59 are concave inwardly, as indicated at 68 and 69, with a smooth gradual curvature so that the web 59 is wider at its ends 71 and 72 than between the ends. Concave side edges 68 and 69 merge in smoothly rounded regions 73 and 74 with the opposite ends of the curved end face 67. At its juncture with the shoulder 62 web 59 is at its widest, this dimension being indicated at $w$ in FIG. 3, and this dimension is slightly wider than the lateral distance between regions 73 and 74 and is the greatest transverse dimension of the mandrel.

Web 61 has planar side surfaces 75 and 76 and at the end opposite shoulder 62 it is secured permanently within a diametral end slot 77 in the conical end 78 of barrel 56. The diameter of the cylindrical surface 79 of barrel 56 is equal to the width of web 61 at this juncture (FIG. 2) so that the opposite side edges 81 and 82 of web 61 merge smoothly into the periphery of barrel 56. These side edges 81 and 82 gradually slowly diverge as they approach shoulder 62 and at the juncture with the shoulder web 61 has the same width $w$ as web 59.

At shoulder 62 the side surfaces of web 59 diverge outwardly at 90° to provide generally axial flat triangular faces 83 and 84 (FIG. 5) that converge at their side edges to apices intersecting the opposite side edge areas 81 and 82 of web 61. Similarly at shoulder 62 the side surfaces of web 61 diverge outwardly at 90° to provide generally axial flat triangular faces 85 and 86 (FIG. 10) that converge at their side edges to apices intersecting side edges 68 of web 59.

Web 59 may be shorter than web 61, and both webs for the major portions of their lengths preferably have the same uniform thickness. The thickness of each web is such that the each is readily flexible to bend in either direction away from its plane but is relatively rigid against bending in its plane. Thus webs 59 and 61 are respectively flexible with respect to the mandrel axis in directions that are at right angles to each other, and each is rigid against flexure with respect to the mandrel axis in directions at 90° with respect to the its directions of flexure.

An annular collar 91 of hard smooth plastic such as polytetrafluoroethylene is mounted on stem 57. Collar 91 has a large diameter section 92 having a smooth outer cylindrical periphery 93 that is preferably of the same diameter as barrel 56, and a longer reduced diameter section 94 having a smooth cylindrical periphery 95. An axial stop face 96 is provided between collar sections 92 and 94.

A thin walled metal feed sleeve 97 having a cylindrical outer surface 98 is slidably mounted on collar section 94, surface 95 acting as both a guide and bearing for movement of the sleeve. As shown in FIG. 4, collar 91 terminates short of the axial face 99 between barrel 56 and stem 57 and a coiled compression spring 101 surround stem 57 and is enclosed within sleeve 97 with its opposite ends abutting the end of collar 91 and an inturned annular flange 102 on sleeve 97.

An annular barrel member 103 having a smooth cylindrical periphery 104 is mounted on stem end section 58 in abutment with axial face 105. Member 103 is fixed on the stem as by a diametral pin 106 extending through member 103 and stem end 58.

The open end of member 103 is closed by a plug 107 of solid temperature resistant synthetic plastic such as polytetrafluoroethylene and similar to that at 48 in FIG. 1.

The cylindrical surfaces 79, 98, 93 and 104 are preferably of equal diameter, and that diameter is slightly less than the maximum web widths $w$ at the web shoulder 62, the tape 41 being thereby spread to cylindrical condition with sufficient force at the web shoulder to insure easy free sliding of the expanded tubing over the cylindrical surfaces of the mandrel in operation.

The shapes of webs 59 and 61 are important in providing for smooth opening and feed movements of the tubing. The wedge-like smooth rounded end 67 which is first encountered by tape 41 easily effects the initial opening, and the shoulder 62 where the mandrel is widest laterally insures sufficient spread. The areas of contact between the webs and the tubing are minimized by the concave edges at 68 and 69 and the inclined edges at 81 and 82. The partially opened tubing 41 leaving shoulder 62 is given its maximum lateral dimension at the shoulder and therefore slides relatively freely toward and over barrel section 56 and the remainder of the mandrel.

Preferably member 103 is of hard steel presenting a smooth cylindrical surface at 104 acting as an anvil for optimum coaction with the cutting blades at 28.

Mandrel 50 is mounted in the apparatus in the same manner as mandrel 40, with feed sleeve 97 disposed for coaction with the chuck jaws and surface 104 disposed for coaction with the cutting blades, and the mode of operation is essentially the same.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A mandrel assembly adapted for use in apparatus for expanding synthetic plastic tubing from flattened to tubular condition, severing tubular elements of predetermined length from the leading end of the expanded tubing and feeding said elements toward a use station, characterized by means defining a longitudinally extending mandrel body, tubing expanding means extending longitudinally from one end of said body within said tubing and comprising at least two angularly related webs disposed in intersecting planes with each web having opposed longitudinally extending smooth edges for engaging the inerior of the tubing during expansion, and a tubing feed member constructed and arranged to be closely surrounded by the expanded tubing mounted on said body for movement longitudinally of said assembly.

2. The assembly defined in claim 1, wherein said body is formed at its other end with an annular anvil surface providing internal backing for said expanded tubing during severing of said tubular elements therefrom and being of sufficient length to support and maintain in expanded condition at least one of said tubular elements after severance.

3. The assembly defined in claim 1, wherein said tubing feed member is a sleeve longitudinally slidable on said body and resilient means is provided for biasing said sleeve toward said expanding means, said resilient means comprising a coil spring surrounding a portion of said body and peripherially enclosed by said sleeve.

4. The mandrel assembly defined in claim 1, further characterized by said angularly related webs being connected end to end.

5. The mandrel assembly in claim 4, wherein said webs comprise a first planar web fixed at one end of said body one end and a second planar web disposed at about 90° to the first web and fixed at one end to the other end of said first web.

6. A mandrel assembly adpated for use in apparatus for expanding synthetic plastic tubing from flattened to tubular condition, severing tubular elements of predetermined length from the leading end of the expanded tubing and feeding said elements toward a use station, characterized by means defining a longitudinally extending mandrel body, tubing expanding means extending longitudinally from one end of said body adapted to extend within said tubing and comprising at least two angularly related webs connected end to end and disposed substantially at right angles in medially intersecting planes, said webs having smooth edges for engaging the interior of said tubing during expansion, and a tubing feed member constructed and arranged to be closely surrounded by the expanded tubing mounted on said body for movement longitudinally along said body.

7. The mandrel assembly defined in claim 6, said tubing expanding means consisting essentially of an integral member of hard smooth slippery synthetic plastic material.

8. The mandrel assembly defined in claim 1, wherein said webs are laterally flexible but relatively rigid against bending in the directions of their opposed tubing engaging edges.

9. The mandrel assembly defined in claim 8, wherein said webs are connected end to end and the rearmost web has a rounded wedge-like rear edge for initial expansion of the tubing.

10. The mandrel assembly defined in claim 9, wherein the opposite lateral edges of the rearmost web are oppositely concave.

11. The mandrel assembly defined in claim 9, wherein said webs are longitudinally separated by a shoulder section, and the side edges of the forwardmost web converge away from said shoulder section to merge into said body.

12. The mandrel assembly defined in claim 1, wherein said tube expanding means comprises an integral hard smooth plastic member having longitudinally spaced flat sided webs at right angles to each other, the rearmost web having a rounded wedge-like rear edge and oppositely concave side edges, and each web being laterally flexible but relatively rigid in the directions of their side edges, all of the tubing contacting surfaces of the webs being smooth and free of sharp cutting edges.

13. The mandrel assembly defined in claim 6, wherein said body comprises a member having an annular surface between said tube spreading means and said feed means and one web is rigidly secured at an end to said body member.

14. The mandrel assembly defined in claim 1, wherein said tubing expanding means is mounted on the rear end of a mandrel body rear portion that has a first annular smooth periphery adjacent said tubing expanding means a fixed stem projecting forwardly from said body rear portion, said feed member comprising a feed sleeve slidably mounted longitudinally of said stem, and means resiliently biasing said feed sleeve toward said tubing expanding means.

15. The mandrel assembly defined in claim 14, comprising a forward body portion having a second annular smooth periphery at the end of said feed sleeve opposite said first annular periphery, said second annular periphery being constructed and arranged for free sliding of the expanded tubing closely thereover and serving as a tubing supporting anvil upon the application of external cutting means, the peripheries of said feed sleeve and said body portions being cylindrical and substantially the same diameter, which diameter is such that the expanded tubing may slide freely thereover longitudinally of the mandrel, and said angularly related webs being longitudinally spaced by a shoulder that has a maximum lateral dimension slightly greater than said diameter such that the tubing expanding force sufficiently spreads said tubing to an internal diameter for free sliding over said body portions.

16. The mandrel assembly defined in claim 14, wherein said resilient biasing means is a compression spring surrounding said stem and enclosed by said sleeve, with one end abutting an internal flange on the sleeve and the other end abutting a fixed body portion.

17. The mandrel assembly defined in claim 1, further characterized by said body being a rigid metal member and there being a forward end portion of heat insulating material on said body.

18. A mandrel assembly comprising a body having longitudinally spaced portions formed with cylindrical surfaces of about the same diameter, a reduced diameter stem extending rigidly between said portions, an annular collar of hard smooth plastic disposed on said stem, a feed slidably mounted on said collar, said collar having a cylindrical portion adjacent the forward body portion, compression spring means surrounding the stem within said sleeve biasing said sleeve toward the rearmost of said body portions, and tubing expanding means comprising angularly related longitudinally spaced laterally flexible webs of hard smooth synthetic plastic, one of said webs being rigidly connected at its forward end to the rearmost body portion and the other of said webs terminating rearwardly in an initial tubing spreading edge, said body portions, said sleeve and said collar portion having external surfaces of about the same diameter and the maximum lateral width of said tubing expanding means being at least equal to said diameter, and a solid body of heat insulation material fixed on the forward end of the mandrel body.

19. The mandrel assembly defined in claim 18, wherein said sleeve is a thin metal tube having at one end an internal flange engaging one end of the spring means, and said collar having an end face engaging the other end of said spring means and an axial face located in the path of forward displacement of said sleeve against the force of said spring.

20. The mandrel assembly defined in claim 18, wherein said forward body portion has a hard metal periphery for serving as a tubing cutting anvil.

21. A mandrel assembly adapted for use in apparatus for expanding moving synthetic plastic tubing from flattened to tubular condition, severing tubular elements of predetermined length from the leading end of the expanded tubing and feeding said elements toward a use station, characterized by means defining a longitudinally rigid mandrel body, tubing expanding means mounted on one end of said body to extent within said tubing and comprising an integral element of hard smooth synthetic plastic fixed at one end to said body, said tubing expanding element comprising flat webs connected end to end in intersecting planes, and each web being flexible laterally of its plane, and a longitudinally slidable tubing feed member on said body constructed and arranged to be closely surrounded by the tubing expanded by said tubing expanding means.

22. A mandrel assembly adpated for use in apparatus foe expanding moving synthetic plastic tubing from flattened to tubular condition, severing tubular elements of predetermined length from the leading end of the expanded tubing and feeding said elements toward a use station, characterized by means defining a mandrel body, tubing expanding means mounted on one end of said body to extend within said tubing and tubing feed means constructed and arranged to be closely surrounded by the tubing expanded by said tubing expanding means mounted on said body for movement longitudinally of said assembly, said tubing expanding means comprising at least two angularly related webs disposed in intersecting planes with each web having opposed longitudinally extending smooth edges for engaging the interior of the tubing during expansion, and said tubing feed means comprising a sleeve longitudinally slidably mounted on said body and spring means on the body enclosed by said sleeve connected to bias said sleeve toward said tubing expanding means.

23. The mandrel assembly defined in claim 22, wherein said body has a smooth cylindrical bearing portion of synthetic plastic which said sleeve is slidable.

* * * * *

UNITED STATES PATENT OFFICE
CERTIFICATE OF CORRECTION

PATENT NO. : 3,940,834
DATED : March 2, 1976
INVENTOR(S) : Dusan S. Lajovic

It is certified that error appears in the above-identified patent and that said Letters Patent are hereby corrected as shown below:

Column 3, line 49, after "except" insert --insofar as such support is exerted--.

Column 5, line 33 after "68" add --and 69--.

Column 5, line 43 before "its" delete --the--.

Column 8, claim 18, line 34, after "feed" insert --sleeve--.

Column 8, claim 21, line 67, change "extent" to --extend--.

Signed and Sealed this eighteenth Day of May 1976

[SEAL]

Attest:

RUTH C. MASON
Attesting Officer

C. MARSHALL DANN
Commissioner of Patents and Trademarks